(12) United States Patent
MacInnis et al.

(10) Patent No.: US 8,446,964 B2
(45) Date of Patent: May 21, 2013

(54) METHOD AND SYSTEM FOR NOISE REDUCTION WITH A MOTION COMPENSATED TEMPORAL FILTER

(75) Inventors: Alexander MacInnis, Lake Oswego, OR (US); Sheng Zhong, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1458 days.

(21) Appl. No.: 11/485,667

(22) Filed: Jul. 13, 2006

(65) Prior Publication Data

US 2007/0014368 A1   Jan. 18, 2007

Related U.S. Application Data

(60) Provisional application No. 60/701,179, filed on Jul. 18, 2005.

(51) Int. Cl.
*H04N 7/64* (2006.01)
*H04N 7/36* (2006.01)
*H04N 7/50* (2006.01)
*H04N 7/34* (2006.01)

(52) U.S. Cl.
USPC ................................ 375/240.29; 375/240.16

(58) Field of Classification Search
USPC ............................ 375/240.29, 240.12, 240.16
See application file for complete search history.

(56) References Cited

U.S. PATENT DOCUMENTS

| 6,167,164 | A * | 12/2000 | Lee ................................ 382/261 |
| 6,298,090 | B1 * | 10/2001 | Challapali et al. ........ 375/240.29 |
| 7,305,199 | B2 * | 12/2007 | Ishihara .......................... 399/81 |
| 7,366,238 | B2 * | 4/2008 | Zeng et al. ................ 375/240.18 |
| 7,944,975 | B2 * | 5/2011 | Cha .......................... 375/240.25 |
| 2004/0028134 | A1 * | 2/2004 | Subramaniyan et al. 375/240.16 |
| 2004/0161257 | A1 * | 8/2004 | Ishihara .......................... 399/81 |
| 2004/0170333 | A1 * | 9/2004 | Toivonen et al. ............. 382/236 |
| 2005/0249293 | A1 * | 11/2005 | Zeng et al. ................ 375/240.29 |
| 2006/0056512 | A1 * | 3/2006 | Barrau ..................... 375/240.16 |

OTHER PUBLICATIONS

Grégoire Pau and Béatrice Pesquet-Popescu, "Uniform Motion-Compensated 5/3 Filterbank for Subband Video Coding", Proc. of 2004 Int'l Conf. on Image Processing (Oct. 2004) 3117, 3119.*
Xiangling Wang, Marta Karczwicz, Yiliang Bao, and Justin Ridge, "Simplified update step operation for MCTF", Joint Video Team Document No. O015 (Apr. 22, 2005).*
John W. Woods and Peisong Chen, "Bidirectional MC-EZBC With Lifting Inmplementation", 14 IEEE Trans. on Circuits and Video Sys. for Video Tech. 1183-1194 (Oct. 2004).*

* cited by examiner

*Primary Examiner* — David Czekaj
*Assistant Examiner* — David N Werner
(74) *Attorney, Agent, or Firm* — Thomas Horstemeyer, LLP (57) ABSTRACT

Described herein is a method and system for the reduction of noise in a video sequence. When motion is present in the video sequence, this system and method identifies motion data. With the motion data, a Motion Compensated Temporal Filter (MCTF) can apply motion compensation prior to filtering in the time domain. Temporal filtering can be performed to reduce visible noise and other detrimental artifacts.

22 Claims, 5 Drawing Sheets

METHOD AND SYSTEM FOR NOISE REDUCTION WITH A MOTION COMPENSATED TEMPORAL FILTER

RELATED APPLICATIONS

This application claims priority to METHOD AND SYSTEM FOR NOISE REDUCTION WITH A MOTION COMPENSATED TEMPORAL FILTER, Provisional Application for U.S. Patent, Ser. No. 60/701,179, filed Jul. 18, 2005, by MacInnis, which is incorporated by reference herein for all purposes.

This application is related to the following applications, each of which is hereby incorporated herein by reference in its entirety for all purposes:

U.S. Provisional Patent Application Ser. No. 60/701,181, METHOD AND SYSTEM FOR MOTION COMPENSATION, filed Jul. 18, 2005 by MacInnis;

U.S. Provisional Patent Application Ser. No. 60/701,180, METHOD AND SYSTEM FOR VIDEO EVALUATION IN THE PRESENCE OF CROSS-CHROMA INTERFERENCE, filed Jul. 18, 2005 by MacInnis;

U.S. Provisional Patent Application Ser. No. 60/701,178, METHOD AND SYSTEM FOR ADAPTIVE FILM GRAIN NOISE PROCESSING, filed Jul. 18, 2005 by MacInnis;

U.S. Provisional Patent Application Ser. No. 60/701,177, METHOD AND SYSTEM FOR ESTIMATING NOISE IN VIDEO DATA, filed Jul. 18, 2005 by MacInnis;

U.S. Provisional Patent Application Ser. No. 60/701,182, METHOD AND SYSTEM FOR MOTION ESTIMATION, filed Jul. 18, 2005 by MacInnis;

U.S. patent application Ser. No. 11/314,679, METHOD AND SYSTEM FOR ANALOG VIDEO NOISE REDUCTION BY BLENDING FIR AND IIR FILTERING, filed Dec. 20, 2005 by Zhong; and U.S. patent application Ser. No. 11/314,680, METHOD AND SYSTEM FOR CONTENT ADAPTIVE ANALOG VIDEO NOISE DETECTION, filed Dec. 20, 2005 by Zhong et al.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The three major analog television standards are NTSC, PAL, and SECAM. The National Television System Committee developed the NTSC standard in the U.S. in 1953. NTSC is used in United States, Canada, Japan, in most of the American continent countries, and in various Asian countries. NTSC runs on 525 lines/frame with a vertical frequency of 60 Hz and a framerate of 29.97 frames/sec.

The PAL (Phase Alternating Line) standard was introduced in the early 1960's in Europe. It has better resolution than NTSC, with 625 lines/frame. The framerate is slightly lower than that of NTSC, being 25 frames/sec. PAL is used in most western European countries (except France), Australia, some countries of Africa, some countries of South America, and in some Asian countries.

The SECAM (Sequential Color with Memory) standard was introduced in the early 1960's. SECAM uses the same bandwidth as PAL but transmits the color information sequentially. SECAM runs on 625 lines/frame with a framerate of 25 fps. SECAM is used in France, former French colonies, and in former communist countries in Europe.

Analog video may be received through broadcast, cable, and VCRs. The reception is often corrupted by noise, and therefore to improve the visual quality, noise reduction may be needed. Various noise filters have been utilized in video communication systems and set top boxes. However, inaccurate noise characterization, especially during scenes with motion, can result in artifacts from the filtering that are more visually detrimental than the original noise.

Limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s) and method(s) for noise reduction, substantially as shown in and/or described in connection with at least one of the figures, as set forth more completely in the claims.

These and other advantages and novel features of the present invention will be more fully understood from the following description.

DETAILED DESCRIPTION OF THE INVENTION

A processor may receive a video sequence that contains noise. When the video sequence is static, a temporal noise filter can be applied to reduce the noise. When objects in the section begin to move, a subtle edge of a moving object can cause motion trails when temporally filtered. To avoid creating motion trails or other video artifacts, the noise filter may be turned off, but when the noise is no longer filtered, it appears to a viewer that the noise level increases. The noise filter may also create additional video artifacts when it is turned on and off.

For example, a picture may contain a person's face, and while the person is still, the picture may appear very clear. When the person begins talking, the face may move slightly, and along the edge of the face, noise may appear. Since filtering noise in the video sequence with motion may cause motion trails, motion compensation is applied within the filter to allow substantial noise reduction while also reducing the generation of new degradation.

A Motion Compensated Temporal Filter (MCTF) can apply motion compensation prior to filtering in the time domain. An accurate motion vector may correspond to a translation over time between a current block and a reference block having similar content. Since the reference block may not contain identical noise, a ratio of wanted signal to noise could increase when a current block and a motion compensated block are combined.

In the example of a picture containing a person's face, a motion vector may indicate that the edge of the person's face is one pixel to the left of where it was in the previous picture. If the block in the previous picture is moved one pixel to the left, temporal filtering can be performed, motion trails are less likely to be created, and visible noise can be reduced.

Figure 1:
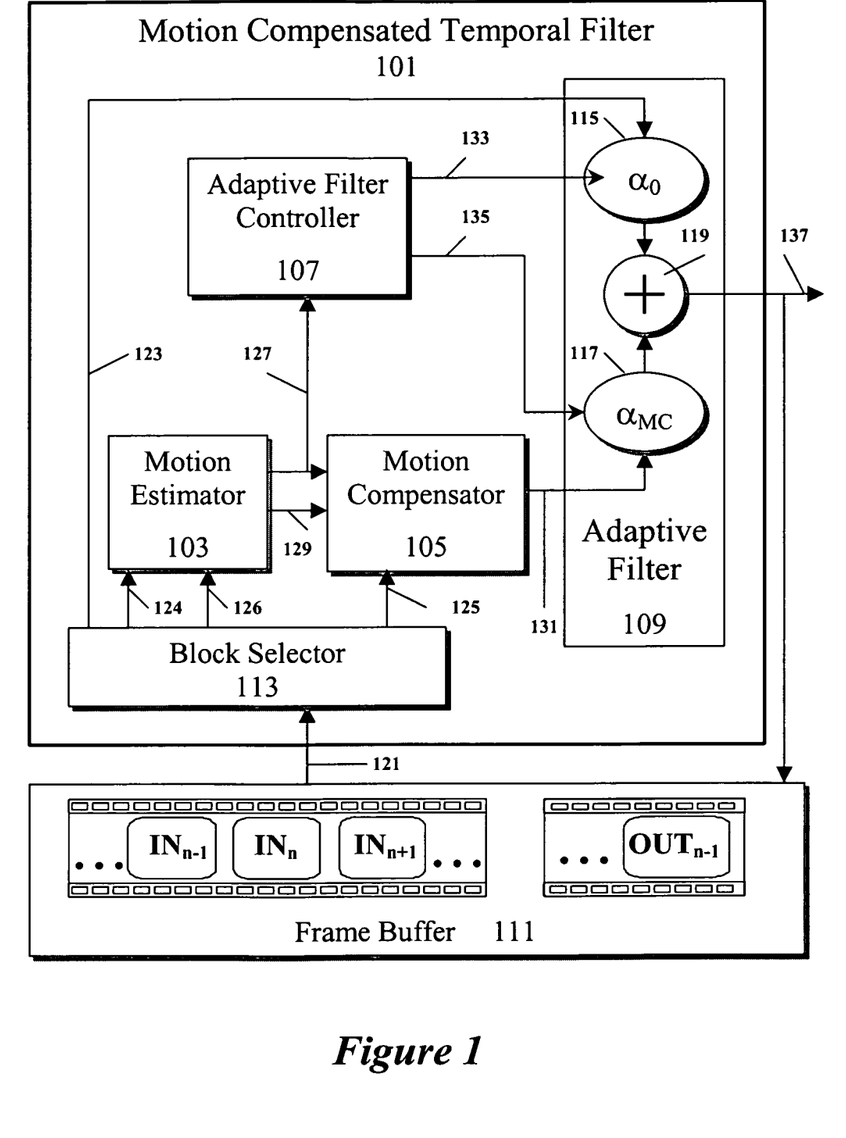
FIG. 1 is a block diagram of an exemplary motion compensated temporal filter in accordance with an embodiment of the present invention.

Referring now to FIG. 1, a block diagram of an exemplary Motion Compensated Temporal Filter (MCTF) 101 is illustrated in accordance with an embodiment of the present invention. The MCTF 101 comprises a motion estimator 103, a motion compensator 105, an adaptive filter 109, and an adaptive filter controller 107. A frame buffer 111 may be a memory that stores pixel data during processing. A block selector 113 may be a hardware or software element that directs blocks of pixel data for processing by the MCTF 101.

Figure 2:
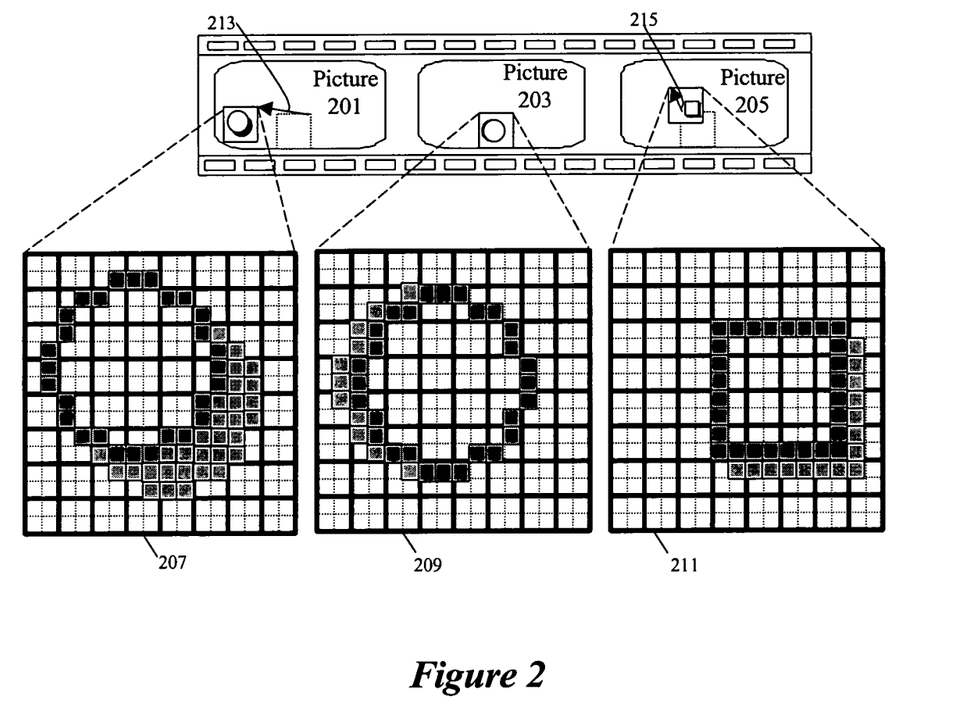
FIG. 2 is a block diagram describing motion estimation in accordance with an embodiment of the present invention.

In FIG. 2, there is illustrated a video sequence comprising pictures 201, 203, and 205 that can be used to describe motion estimation. Motion estimation may utilize a previous picture 201 and/or a future picture 205. A reference block 207 in the previous picture 201 and/or a reference block 211 in the future picture 205 may contain content that is similar to a current block 209 in a current picture 203. Motion vectors 213 and 215 give the relative displacement from the current block 209 to the reference blocks 207 and 211 respectively.

A block is a set of pixels to which the motion vector applies. A 16×16 block corresponds to a motion vector per macroblock. A 16×16 block is more likely than a smaller block to cause false motion artifacts when objects having different motion velocities are small or spatially close together. The smallest size a block can be is 1×1, i.e. one pixel.

Since the sampling density of a block may not be the same in both the vertical axis and the horizontal axis, the dimensions of a block can take different values. In a 4×3 interlaced picture with 720 pixels horizontally and 240 pixels vertically in a field, the horizontal sampling density is approximately two and one-quarter times the vertical sampling density. A 3×1 block would appear approximately square when displayed. A "window" is an array of sample locations used for measurement purposes.

FIG. 2 also illustrates an example of a scene change. In the first two pictures 201 and 203 a circle is displayed. In the third picture 205 a square is displayed. There will be a high confidence that the past reference block 207 can predict the current block 209, and there will be a low confidence that the future reference block 211 can predict the current block 209.

Confidence may be different than the sum of absolute differences (SAD). The motion vector with the highest confidence may not be the motion vector with the lowest SAD. The lowest SAD vector may be erroneous due to noise. Cost metrics, such as SAD, can be combined together in order to estimate confidence.

The expected value of a metric can be subtracted from the actual metric and the difference can be scaled. This is a normalization that generates a range of values. To combine cost metrics, each metric should have the same zero point and the same range. The normalized metric values can be added together. Alternatively, cost metrics that represent probabilities may be multiplied together.

Confidence and other quality metrics utilized in certain embodiments of the present invention can be generated by the system(s), method(s), or apparatus described in METHOD AND SYSTEM FOR MOTION COMPENSATION, Ser. No. 60/701,181, filed Jul. 18, 2005 by MacInnis, which is incorporated herein by reference for all purposes.

Figure 3:
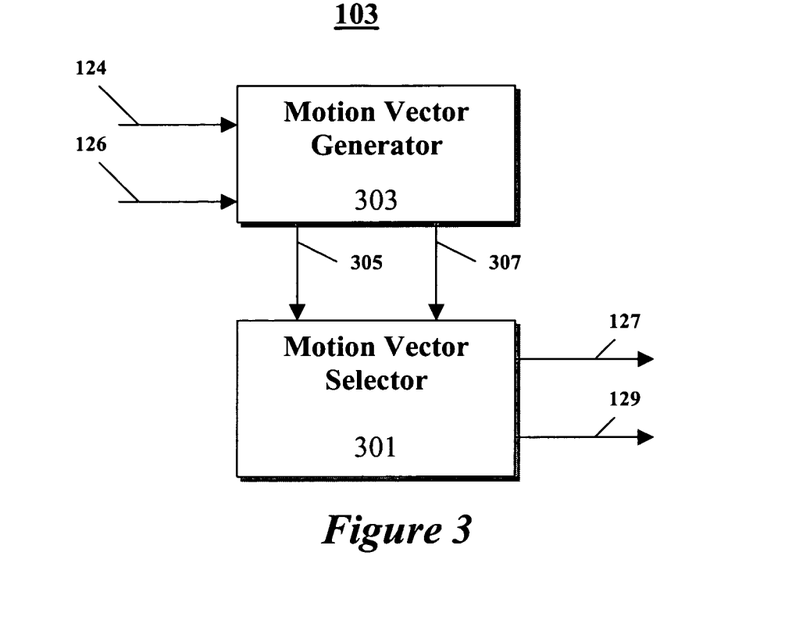
FIG. 3 is a block diagram of an exemplary motion estimator in accordance with an embodiment of the present invention.

Referring back to FIG. 1, the block selector 113 directs a current input window 124 and one or more reference pictures 126 to the motion estimator 103 (shown with more detail in FIG. 3). Based on the input 124 and 126, a motion vector generator 303 produces a plurality of candidate motion vectors 305 that are associated with a plurality of quality metrics 307 such as confidence. These motion vectors 305 may be interpolated to half-pixel or finer resolution and may be associated with blocks in a measurement window that is larger than the current input block.

Spatial Extension of the Measurement Window

The current input block can be compared to reference block(s) in another input and/or output picture(s) that may be temporally located before or after the current picture. Additionally, pixel(s) near the current block, in a neighborhood larger than the current block, can be compared to reference pixel(s) in another input and/or output picture(s) that may be temporally located before or after the current picture. The motion vectors associated with the current block and the neighboring pixels(s) define a measurement window. This measurement window can be extended by a number of pixels in each dimension. Within the measurement window, the motion estimator 103 can measure the quality of a candidate motion vector over an area larger than would be associated with the current block alone. This spatial extension of the measurement window can reduce the occurrence of spurious motion vectors that may arise from noise associated with small block sizes.

Temporal Extension of the Measurement Window

Noise may cause some incorrect motion vectors. It is common for a motion vector to go through the previous picture, the current picture, and the future picture forming a straight line in time and space. A higher confidence can be associated with motion vectors that are consistent over time. Likewise, the candidate motion vectors for a current block can include the motion vector(s) that were used to predict the reference block(s). This extension of the measurement window in time can reduce the occurrence of spurious motion vectors that may arise from random noise.

A motion vector selector 301 selects one or more motion vectors 129. A motion vector 129 is associated with a reference block and a current input block within the current input window 124.

The motion vector selector 301 can eliminate a candidate motion vector based on the noise level measured in the video stream. If a candidate motion vector with low cost is not much better than the zero motion vector it may be due to high noise and not motion. If the cost of the lowest-cost motion vector is not sufficiently less than the cost of the zero motion vector, the zero motion vector may be selected. In this situation, objects may not be moving and motion compensation with non-zero motion vectors could make objects appear to wobble. A threshold can be set to define "sufficiently less". The threshold can be based on a noise distribution statistic or determined empirically based on perceptual quality.

Noise distribution statistics utilized in certain embodiments of the present invention can be generated by the system(s), method(s), or apparatus described in METHOD AND SYSTEM FOR ESTIMATING NOISE IN VIDEO DATA, Ser. No. 60/701,177, filed Jul. 18, 2005 by MacInnis, and incorporated herein by reference for all purposes.

Figure 4:
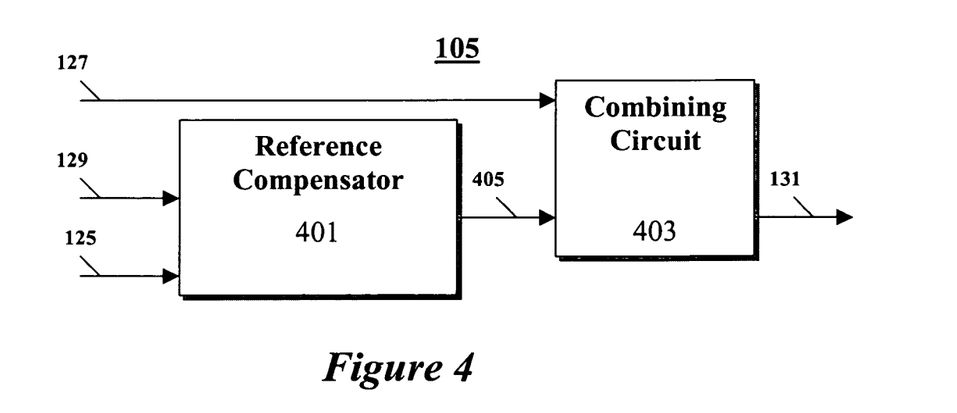
FIG. 4 is a block diagram of an exemplary motion compensator in accordance with an embodiment of the present invention.

The block selector 113 directs the reference block(s) 125 to the motion compensator 105 (shown with more detail in FIG. 4). A reference compensator 401 applies the motion vector(s) 129 to the reference block(s) 125 to generate one or more motion compensated (MC) blocks 405.

Spreading of Motion Vectors with High Confidence

A pixel with a non-zero motion vector may neighbor a pixel with a zero motion vector. Zero motion vectors that are sporadically selected can create strange artifacts that appear as little twittering spots. To remove this artifact, a motion vector with a high confidence can be applied to neighboring blocks that have motion vectors with a lower confidence. This spreading of confident motion vectors fills in little spots of bad vectors. Confident motion vectors may improve immediate neighbors and neighbors up to, for example, eight pixels away.

When only one MC block 405 is selected, the MC block 405 is output 131 to the adaptive filter 109. When more than one motion vector 129 is selected, a combining circuit 403 can combine the MC blocks 405 based on quality metrics 127 associated with each motion vector 129 used in the MC block 405 generation. The combination is output 131 to the adaptive filter 109.

The adaptive filter may be implemented as an IIR filter, and FIR filter, or a combination of an IIR and FIR filter. For example within an IIR adaptive filter 109, the MC block 405 or MC block combination 131 is scaled by a value $\alpha_{MC}$ 117. The block selector 113 directs the current block 123 to the adaptive filter 109 where it is scaled by a value $\alpha_0$ 115. The scaled blocks are combined 119 to generate a current output block 137.

The filter controller 107 adapts $\alpha_0$ 115 and $\alpha_{MC}$ 117 according to the quality metrics 127. A residual is the difference between the current picture and the motion compensated reference block. By examining the characteristics of the residual, the quality of motion compensation can be determined. If there is content in the residual, the motion compensation is imperfect. By examining the characteristics of the residual, it may be determined that the portion of the output that is motion compensated should be reduced by lowering $\alpha_{MC}$.

A method of examining the characteristics of the residual may include comparing the magnitude of the residual to a previously obtained noise distribution. If the residual falls within the bounds of AWGN (Additive White Gaussian Noise) confidence may be considered to be high. If the residual does not fit the noise distribution, $\alpha_0$ can be adaptively increased toward one, and $\alpha_{MC}$ can be decreased as $(1-\alpha_0)$.

The current output block 137 may be sent to the frame buffer 111. In some configurations, the MCTF 101 may use the current output block 137 as a reference block in a future processing cycle.

Noise Reduction by FIR Filtering

An FIR filter can be used to filter a video signal using a form of averaging. If a sequence of N blocks contains the same content and uncorrelated white Gaussian noise, the following table can give the improvement in Signal to Noise Ratio (SNR).

| N | SNR improvement | |
|---|---|---|
| 1 | 0 dB | (No Averaging) |
| 2 | 3 dB | |
| 3 | 4.8 dB | |
| 4 | 6 dB | |
| 5 | 7 dB | |

The number of taps, N, may be fixed or adapted. The tap weights for an averaging filter may be equal (e.g. 1/N). Alternatively, a lowpass FIR may be designed with tap weights that have non-equal values.

Noise Reduction by IIR Filtering

The MCTF output 137 may also be used to predict the current input block 123. A first order IIR filter can be formed by directing the motion estimator 103 and the motion compensator 105 to select and utilize a motion vector associated with a past output block 137. If the current input block 123 and the past output block 137 have the same content and uncorrelated white Gaussian noise, the following table can give the improvement in Signal to Noise Ratio (SNR). The scalar value $\alpha_0$ is assumed to equal $1-\alpha_{MC}$.

| $\alpha_0$ | SNR improvement | |
|---|---|---|
| 1 | 0 dB | (No Filtering) |
| 2/3 | 3 dB | |
| 1/2 | 4.8 dB | |
| 2/5 | 6 dB | |
| 1/3 | 7 dB | |

Since a first order IIR filter only requires one reference, less memory is required for some IIR filter designs. The confidence level 127 associated with the selected motion vector can determine the IIR tap weight, $\alpha_{MC}$.

Noise Reduction by Dynamically Blending Filters

As $\alpha_0$ is made smaller, the time history of the IIR filter could be potentially very long. A long time history may cause motion trails more often than an FIR filter. For example, a moving object having a subtle pattern (e.g. a rug or a couch) that is visibly recognizable in the presence of noise may appear distorted. As a result of the IIR filtering, a residue of either the noise or the pattern may not move with the content, thereby creating a "dirty glass" effect. The content is moving, and the "glass" is not.

The noise reduction in certain embodiments of the present invention can be based on the system(s), method(s), or apparatus described in METHOD AND SYSTEM FOR ANALOG VIDEO NOISE REDUCTION BY BLENDING FIR AND IIR FILTERING, Ser. No. 11/314,679, filed Dec. 20, 2005 by Zhong, and incorporated herein by reference for all purposes.

The noise detection in certain embodiments of the present invention can be based on the system(s), method(s), or apparatus described in METHOD AND SYSTEM FOR CONTENT ADAPTIVE ANALOG VIDEO NOISE DETECTION, Ser. No. 11/314,680, filed Dec. 20, 2005 by Zhong et al., and incorporated herein by reference for all purposes.

To take advantage of both the FIR and the IIR structures, reference blocks may be selected from the previous input pictures, the future input pictures, and the output of the MCTF. With normalized metric values the motion compensator can dynamically blend an FIR filter with an IIR filter.

Prior to blending, motion compensated reference blocks with a high confidence may be weighted more than those with a low confidence.

Figure 5:
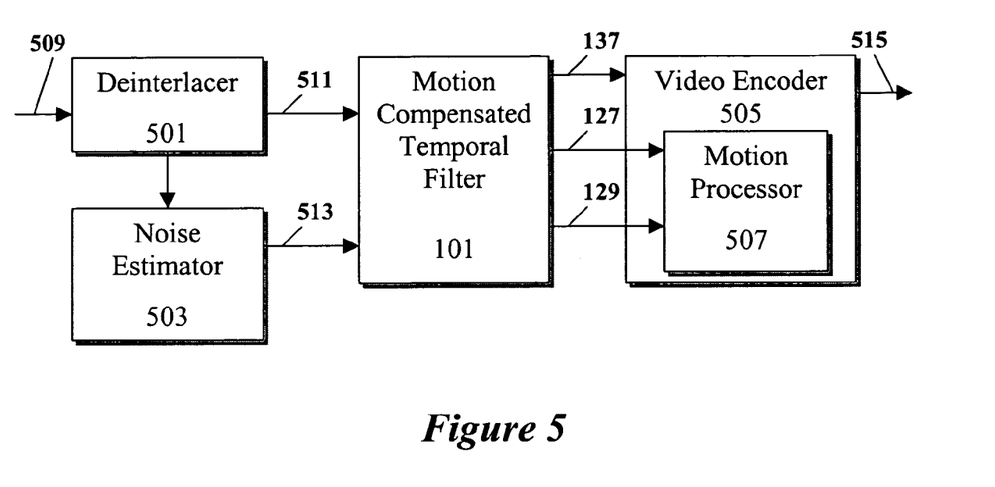
FIG. 5 is a block diagram of an exemplary video encoding system comprising a motion compensated temporal filter in accordance with an embodiment of the present invention.

FIG. 5 is an exemplary block diagram of a video encoding system comprising a motion compensated temporal filter 101 in accordance with an embodiment of the present invention. If analog video is to be digitally encoded, a motion processor 507 can use the motion data from the MCTF 101 to generate an a priori measure of confidence for the video encoder 505. The video encoder 505 may produce an encoded output 515 according a wide variety of standards.

The combination of digital encoding and MCTF in certain embodiments of the present invention can be based on the system(s), method(s), or apparatus described in METHOD AND SYSTEM FOR MOTION ESTIMATION, Ser. No. 60/701,182, filed Jul. 18, 2005 by MacInnis, and incorporated herein by reference for all purposes.

In cases where the analog video 509 is interlaced, a deinterlacer 501 may be used to generate a progressive input 511 to the MCTF 101. A noise estimator 503 may be utilized to generate noise distribution statistics 513 for the MCTF 101.

Figure 6:
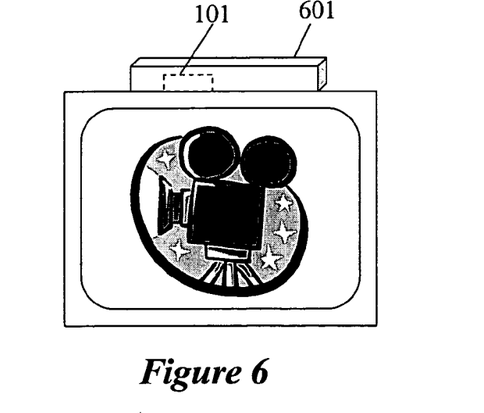
FIG. 6 is a picture of an exemplary video display device in accordance with an embodiment of the present invention.

FIG. 6 is a picture of an exemplary video display device 601 containing an MCTF 101 in accordance with an embodiment of the present invention. This video display device may be a set top box that receives noisy analog video. The MCTF 101 reduces noise prior to the display or further processing of the communicated video data.

Figure 7:
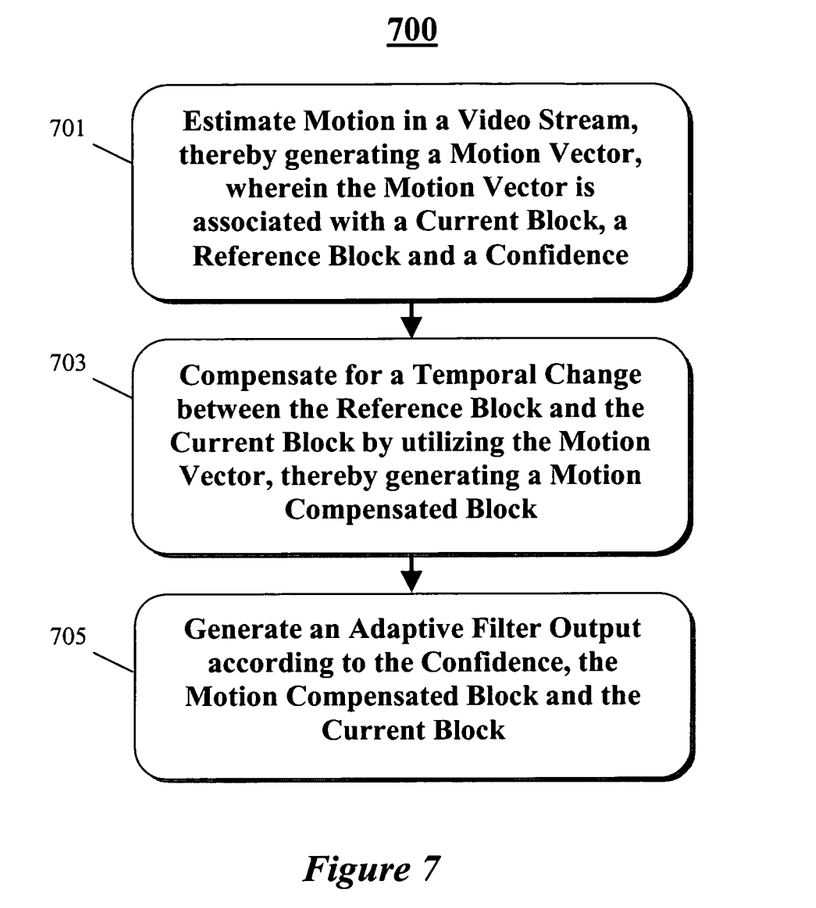
FIG. 7 is a flow diagram of an exemplary method for filtering a video sequence in accordance with an embodiment of the present invention.

FIG. 7 is a flow diagram 700 of an exemplary method for filtering a video sequence in accordance with an embodiment of the present invention. At 701, motion is estimated in a video stream, thereby generating a motion vector, wherein the motion vector is associated with a current block, a reference block and a confidence. The motion vector can be selected from a plurality of candidate motion vectors based on confidence or another quality metric or a combination thereof. The plurality of candidate motion vectors can include motion vectors associated with blocks in a neighborhood near the current block.

By utilizing the motion vector to compensate for a temporal change between the reference block and the current block, a motion compensated block is generated at 703. There can be more than one reference block. Another motion vector can be selected from the plurality of candidate motion vectors and applied to another reference block. Multiple motion compensated reference blocks can be dynamically scaled and combined according to the confidence or another quality metric. The reference block(s) can be a past input block(s), a future input block(s), and/or a past output block(s).

At 705, an adaptive filter output is generated according to the confidence, the motion compensated block and the current block. For example in an IIR filter design, the current block and the motion compensated block may be scaled. The scaled motion compensated block and the scaled current block may be combined to generate the output. The scale factors applied to the current block and the motion compensated block can be adapted according to the confidence or another quality metric.

The embodiments described herein may be implemented as a board level product, as a single chip, application specific integrated circuit (ASIC), or with varying levels of a video processing circuit integrated with other portions of the system as separate components. An integrated circuit may store video data in memory and use an arithmetic logic circuit to perform MCTF processing.

The degree of integration of the video processing circuit will primarily be determined by the speed and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, the invention can be applied to video data associated with a wide variety of analog and/or digital standards.

Therefore, it is intended that the present invention not be limited to the particular embodiment disclosed, but that the present invention will include all embodiments falling within the scope of the appended claims.

The invention claimed is:

1. A method for the reduction of noise in a current video block, said method comprising:
   in a motion compensated temporal filter (MCTF),
      generating for the current video block a plurality of candidate motion vectors and a plurality of respective confidence values,
      wherein the confidence values provide an indication of accuracy of each of the candidate motion vectors in a prediction process involving a reference block;
      selecting one of the candidate motion vectors based on an evaluation of the confidence values, the one of the candidate motion vectors associated with a first confidence value;
      generating a first motion compensated block though application of the selected motion vector to a first reference block; and
      filtering the current video block and the first motion compensated block according to the first confidence value to generate a current filtered block, the filtering comprising:
      scaling the current video block according to a first scaling value;
      scaling the first motion compensated block according to a second scaling value; and
      combining the current video block with the first motion compensated block, wherein the first and second scaling values are based on the first confidence value.

2. The method of claim 1, wherein:
   scaling the current video block comprises scaling by a first weight to generate a weighted current video block;
   scaling the first motion compensated block comprises scaling by a second weight to generate a weighted motion compensated block; and
   combining comprises combining the weighted current video block with the weighted motion compensated block to generate the current filtered block.

3. The method of claim 2, wherein the method further comprises:
   adapting the first weight and the second weight according to first confidence value, wherein the first confidence value is measured over a window of pixels associated with the current video block that includes neighboring pixels extending from the current video block in addition to the pixels of the current video block.

4. The method of claim 1, wherein a height of the current video block and the height of the first motion compensated block are four pixels or less.

5. The method of claim 1, wherein the method further comprises:
selecting a second motion vector from the plurality of candidate motion vectors based on the evaluation of the confidence values, the second motion vector associated with a second confidence value;
applying the second motion vector to a second reference block to provide a second motion compensated block; and
combining the first and second motion compensated blocks, wherein the filtering comprises filtering the current video block and the combination of the first and second motion compensated blocks to provide the current filtered block.

6. The method of claim 1, wherein the first reference block is a past video block that is located in a video sequence prior to the current video block.

7. The method of claim 1, wherein the first reference block is a future video block that is located in a video sequence after the current video block.

8. The method of claim 1, wherein the first reference block is a past filtered block generated prior to the current filtered block.

9. The method of claim 1, wherein the filtering is averaging-based.

10. The method of claim 1, wherein the filtering is based on a quantity of taps that is either fixed or adaptive.

11. The method of claim 1, wherein the filtering is based on tap weights of equal or non-equal values.

12. A system for the reduction of noise in a current video block, said system comprising:
a motion compensated temporal filter, comprising:
a motion estimator configured to:
receive a reference picture and a current input window, the current input window comprising the current video block and a plurality of neighboring pixels;
generate a plurality of candidate motion vectors and a plurality of confidence values that include a first confidence value, the plurality of confidence values each providing an indication of accuracy of a respective candidate motion vector in a prediction process involving a reference block, the plurality of confidence values corresponding to the plurality of candidate motion vectors associated with the current input window; and
select a first motion vector from the plurality of candidate motion vectors based on the plurality of confidence values, the first motion vector associated with the first confidence value;
a motion compensator configured to generate a motion compensated block based on application of the first motion vector to a first reference block; and
a filter configured to:
apply a first scaling factor to the current video block and a second scaling factor to the motion compensated block, the first and second scaling factors based on the first confidence value; and
combine the current video block and the motion compensated block to generate a current filtered block.

13. The system of claim 12, wherein the filter is configured to:
scale the current video block by a first weight to generate a weighted current input block;
scale the motion compensated block by a second weight to generate a weighted motion compensated block; and
combine the weighted current input block with the weighted motion compensated block to generate the current filtered block.

14. The system of claim 12, wherein a height of the current video block and the height of the motion compensated block are four pixels or less.

15. The system of claim 12, wherein the first reference block is a past video block that is located in a video sequence prior to the current video block.

16. The system of claim 12, wherein the first reference block is a future video block that is located in a video sequence after the current video block.

17. The system of claim 12, wherein the first reference block is a past filtered block that was generated by the filter prior to the current filtered block.

18. The system of claim 12, wherein:
the motion estimator is further configured to select a second motion vector from the plurality of candidate motion vectors based on the plurality of confidence values, the second motion vector associated with a second confidence value;
the motion compensator is further configured to apply the second motion vector to a second reference block to provide a second motion compensated block and combine the motion compensated block and the second motion compensated block; and
the filter is further configured to filter the current video block and the combination of the motion compensated block and the second motion compensated block to provide the current filtered block.

19. The system of claim 12, wherein the filter is configured as an IIR filter, an FIR filter, or a combination of IIR and FIR filters.

20. A communication device comprising:
an integrated circuit comprising:
a memory configured to store a video sequence;
a motion compensated temporal filter comprising plural circuits, the plural circuits comprising:
a motion estimator configured to select a first motion vector from a plurality of candidate motion vectors that are associated with a current video block, the first motion vector associated with a confidence value that provides an indication of accuracy in a prediction process involving a reference block;
a motion compensator configured to generate a motion compensated block based on application of the first motion vector to a first reference block; and
a filter configured to scale the current video block according to a first scaling factor and the motion compensated block according to a second scaling factor, the first and second scaling factors based on the confidence value, the filter further configured to combine the scaled blocks to generate a current filtered block.

21. The communication device of claim 20, wherein:
the motion estimator is further configured to select a second motion vector from the plurality of candidate motion vectors based on a second confidence value, the second motion vector associated with the second confidence value;
the motion compensator is further configured to apply the second motion vector to a second reference block to provide a second motion compensated block and combine the motion compensated block and the second motion compensated block; and the filter is further configured to filter the current video block and the combination of the motion compensated block and the second motion compensated block to provide the current filtered block.

22. The communication device of claim 20, wherein the filter is configured as an IIR filter, an FIR filter, or a combination of IIR and FIR filters.

* * * * *